United States Patent [19]

Thill

[11] Patent Number: 4,883,836
[45] Date of Patent: Nov. 28, 1989

[54] BLEND OF POLYCARBONATE AND POLYAMIDE COMPATIBILIZED WITH A POLYALKYLOXAZOLINE

[75] Inventor: Bruce P. Thill, Midland, Mich.

[73] Assignee: The Dow Chemical Company, Midland, Mich.

[21] Appl. No.: 264,929

[22] Filed: Oct. 31, 1988

[51] Int. Cl.⁴ ............................................. C08L 77/00
[52] U.S. Cl. ........................................ 525/66; 525/67; 525/92; 525/146; 525/148

[58] Field of Search .................... 525/66, 67, 92, 246, 525/148, 433, 467

[56] References Cited

U.S. PATENT DOCUMENTS

| | | | |
|---|---|---|---|
| 3,658,752 | 4/1972 | Dua | 260/41.5 A |
| 4,111,895 | 9/1978 | Gergen et al. | 260/42.18 |
| 4,317,891 | 3/1982 | Sakano et al. | 525/66 |

Primary Examiner—Theodore E. Pertilla

[57] ABSTRACT

Polyalkyloxazolines are useful as compatibilizing agents in polycarbonate/polyamide resin blends.

16 Claims, No Drawings

BLEND OF POLYCARBONATE AND POLYAMIDE COMPATIBILIZED WITH A POLYALKYLOXAZOLINE

FIELD OF THE INVENTION

This invention relates to a novel composition of matter comprising a blend of polycarbonate and polyamide resins, compatibilized with a polyalkyloxazoline.

BACKGROUND OF THE INVENTION

Polyamides are condensation products containing recurring amide groups, generally prepared by the condensation of a diamine and a dibasic acid or their equivalents, or the polymerization of bifunctional monomers. Polyamides are frequently referred to as nylons, and include, for example nylon 4, nylon 6, nylon 6,6, nylon 6,9, nylon 6,12, nylon 7, nylon 8, nylon 9, nylon 11, nylon 12, etc. Polyamides generally exhibit good solvent resistance, hydrolytic stability, abrasion resistance and mechanical strength due to their highly crystalline structure. They, however, do exhibit poor dimensional stability in humid environments due to water absorption, as well as poor creep performance at typical use temperatures.

Polycarbonates are well-known commercially available resinous materials having a variety of applications. They are typically prepared by the reaction of dihydroxy compounds and a carbonate precursor, such as phosgene. Polycarbonates are high temperature, high performance thermoplastic engineering polymers with a good combination of thermal and mechanical properties, especially when the polymer is prepared from one or more aromatic diols. However, polycarbonates do exhibit poor solvent resistance, particularly when exposed to humid environments for prolonged times and/or at elevated temperatures.

Polycarbonate/polyamide blends might be expected to have a useful balance of properties. Such blends could possess improved creep resistance and higher temperature resistance due to the polycarbonate component, and improved solvent resistance as a result of the polyamide component. Unfortunately, attempts to modify the properties of polycarbonate resins by blending with polyamides are quite often unsatisfactory because of their incompatibility. Simple blends of polycarbonate and polyamide resins are deficient in mechanical properties such as elongation and impact strength, thereby suggesting low interfacial adhesion.

Most combinations of polymers are not compatible, although a number of notable exceptions are known. Generally, polymers adhere poorly to one another resulting in interfaces between the component domains which provide natural sites for mechanical failures due to flaws and crack propagation. Because of this, the polymers are said to be "incompatible". Occasionally, such polymer blends may be compatibilized by adding a third component, referred to as a compatibilizing agent. The compatibilizing agent generally locates at the interface between the polymers and greatly improves interfacial adhesion, and thereby increases the stability to gross phase separation.

U.S. Pat. No. 4,111,895 discloses the use of a block copolymer, such as styrene-butadiene-styrene, as a compatibilizing agent between polycarbonate and a host of dissimilar thermoplastics, including polyamide. U.S. Pat. No. 4,317,891 discloses a blend of polycarbonate, polyamide, and a conjugated diene rubber copolymer. The copolymer does not, however, act as a compatibilizing agent, and the amount of polyamide is limited to 20 weight percent due to incompatibility with the polycarbonate at higher concentrations. Finally, U.S. Pat. No. 3,658,752 discloses a blend of an elastomer and a polyamide, and additionally contains as a third component a filler which acts as a compatibilizing agent.

SUMMARY OF THE INVENTION

The present invention is directed toward a novel blend of polycarbonate and polyamide resins, compatibilized with a polyalkyloxazoline. Optionally, the compatibilized blend may contain, as a fourth component, a rubber impact modifier.

Surprisingly, it has been discovered that a polyalkyloxazoline is an effective compatibilizing agent in blends of polycarbonate and polyamide resins. The compatibilized, three-component blends of the present invention exhibit higher impact resistance, elongation, and solvent resistance than two-component polycarbonate/polyamide blends or such blends containing the third component compatibilizers heretofore known in the art. Optionally, the compatibilized blend may contain a rubber impact modifier.

The compatibilized blends of the present invention have utility where the combination of high modulus, temperature and solvent resistance, dimensional stability, creep resistance, hydrolytic stability, high elongation and impact strength are required, such as automotive body panels, appliance housings and electrically insulating molded components.

DETAILED DESCRIPTION

The aromatic polycarbonates suitable for use in the present invention are produced by any of the conventional processes known in the art for the manufacture of polycarbonates. Generally, aromatic polycarbonates are prepared by reacting an aromatic dihydric phenol with a carbonate precursor such as for example phosgene, a haloformate or a carbonate ester.

A preferred method for preparing the aromatic polycarbonates suitable for use in the present invention involves the use of carbonyl halide, such as phosgene, as the carbonate precursor. This method involves passing phosgene gas into a reaction mixture containing an activated dihydric phenol, or a non-activated dihydric phenol and an acid acceptor, such as for example pyridine, dimethyl aniline, quinoline and the like. The acid acceptor may be used undiluted or diluted with inert organic solvents, such as methylene chloride, chlorobenzene or 1,2-dichloroethane. Tertiary amines are advantageous since they are good solvents as well as acid acceptors during the reaction.

The temperature at which the carbonyl halide reaction proceeds may vary from below 0° C. to about 100° C. The reaction proceeds satisfactorily at temperatures from room temperature to 50° C. Since the reaction is exothermic, the rate of phosgene addition may be used to control the temperature of the reaction. The amount of phosgene required will generally depend upon the amount of dihydric phenols present. Generally speaking, one mole of phosgene will react with one mole of dihydric phenol to form the polycarbonate and two moles of HCl. The HCl is in turn taken up by the acid acceptor.

Another method for preparing the aromatic polycarbonates useful in the present invention comprises adding phosgene to an alkaline aqueous suspension of dihydric phenols. This is preferably done in the presence of inert solvents such as methylene chloride, 1,2-dichloroethane and the like. Quaternary ammonium compounds may be employed to catalyze the reaction.

Yet another method for preparing such aromatic polycarbonates involves the phosgenation of an agitated suspension of the anhydrous alkali salts of aryl diols in a nonaqueous medium such as benzene, chlorobenzene or toluene. The reaction is illustrated by the addition of phosgene to a slurry of the sodium salt of, for example, Bisphenol A in an inert polymer solvent such as chlorobenzene. The organic solvent should preferably be a polymer solvent.

Generally speaking, a haloformate such as the bishaloformate of Bisphenol A may be utilized in the same manner as the carbonate precursor in any of the methods described above.

When a carbonate ester is used as the carbonate precursor in the polycarbonate forming reaction, the materials are reacted at temperatures in excess of 100° C., for times varying from 1 to 15 hours. Under such conditions, ester interchange occurs between the carbonate ester and the dihydric phenol used. The ester interchange is advantageously consummated at reduced pressures on the order of from about 10 to about 100 millimeters of mercury, preferably in an inert atmosphere such as nitrogen or argon.

Although the polymer forming reaction may be conducted in the absence of a catalyst, one may, if desired, employ a typical ester exchange catalyst, such as metallic lithium, potassium, calcium or magnesium. The amount of such catalyst, if used, is usually small, ranging form about 0.001% to about 0.1%, based on the moles of the dihydric phenols employed.

In the solution methods of preparation, the aromatic polycarbonate emerges from the reaction in either a true or pseudo solution depending on whether an aqueous base or pyridine is used as an acid acceptor. The copolymer may be precipitated from the solution by adding a polymer nonsolvent, such as heptane or isopropanol. Alternatively, the polymer solution may be heated, typically under reduced pressure, to evaporate the solvent.

A preferred aromatic polycarbonate is characterized by repeated units corresponding to the general formula:

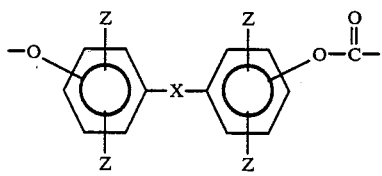

wherein X is a divalent $C_1$–$C_{15}$ hydrocarbon radical, a single bond, —O—, —S—, —$S_2$—, —SO—, —$SO_2$—, or —CO—, and each Z is independently hydrogen, a halo radical, or a $C_1$–$C_4$ alkyl radical. Examples of aromatic dihydroxy compounds from which the preferred polycarbonates may be prepared include, but are not limited to, 2,2-bis-(4-hydroxyphenyl)-propane, bis-(4-hydroxyphenyl)-methane, 1,1-bis-(4-hydroxyphenyl)-butane, 1,1-bis-(4-hydroxyphenyl)-cyclohexane, bis-(4-hydroxyphenyl)ketone, bis-(4-hydroxyphenyl)-sulfone, bis-(4-hydroxyphenyl)-ether, 2,2-bis-(3,5-dichloro-4-hydroxyphenyl)-propane, 2,2-bis-(3,5-dimethyl-4-hydroxyphenyl)-propane, and the like. A most preferred aromatic polycarbonate is prepared from 2,2-bis-(4-hydroxyphenyl)-propane (Bisphenol A).

The aforementioned methods of preparing aromatic polycarbonates are more fully set forth in U.S. Pat. Nos. 2,999,846, 3,028,365, 3,148,172, 3,153,008, 3,248,414, 3,271,367, and 4,452,968, which are hereby incorporated by reference thereto.

The polyamides suitable for use in the present invention are prepared by polymerizing a monoaminomonocarboxylic acid, or an internal lactam thereof, having at least two carbon atoms between the amino and carboxylic acid groups. Alternatively, they may be prepared by polymerizing substantially equimolar proportions of a diamine, which contains at least two carbon atoms between the amino groups, and a dicarboxylic acid. Yet another method for preparing the polyamides of the present invention is by polymerizing a monoaminomonocarboxylic acid, or an internal lactam thereof, together with substantially equimolar proportions of a diamine and a dicarboxylic acid. The dicarboxylic acid may be used in the form of a functional derivative thereof, such as for example, an ester.

Examples of monoaminomonocarboxylic acids or lactams thereof for preparing polyamides include, but are not limited to, those compounds containing from 2 to 16 carbon atoms between the amino and carboxylic acid groups, said carbon atoms forming a ring with the —CONH— group in the case of a lactam. As particular examples of monoaminomonocarboxylic acids and lactams there may be mentioned ε-aminocaproic acid, butyrolactam, pivalolactam, caprolactam, capryl-lactam, enantholactam, endecanolactam, dodecanolactam, and 3- and 4-amino benzoic acids. A preferred monoaminomonocarboxylic acid is caprolactam.

Examples of preferred diamines for preparing polyamides to be used according to the present invention correspond to the general formula:

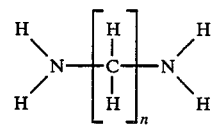

wherein n is an integer from 2 to 16. Specific examples include, but are not limited to, trimethylenediamine, tetramethylenediamine, pentamethylenediamine, hexamethylenediamine, octamethylenediamine, decamethylenediamine, dodecamethylenediamine and hexadecamethylenediamine. Other suitable diamines include, but are not limited to, 2,2-dimethylpentamethylenediamine, 2,2,4- and 2,4,4-trimethylhexamethylenediamine, p-phenylenediamine, 4,4'-diaminodiphenyl sulfone, 4,4'-diaminodiphenyl ether, 4,4'diaminodiphenylmethane and diaminodicyclohexylmethane. A most preferred diamine is hexamethylenediamine.

The dicarboxylic acids suitable for preparing polyamides for use according to the present invention may be aromatic, such as for example, isophthalic acid or terephthalic acid. Preferred dicarboxylic acids correspond to the general formula:

wherein Y is a divalent aliphatic radical containing at least 2 carbon atoms. Examples of such acids include, but are not limited to, sebacic acid, octadecanedioic acid, suberic acid, adipic acid, azelaic acid, undecanedioic acid, glutaric acid, pimelic acid and oxalic acid. A most preferred dicarboxylic acid is adipic acid.

Specific examples of polyamides for use according to the present invention are polypyrrolidone (nylon 4), polycaprolactam (nylon 6), polyhexamethylene adipamide (nylon 6,6), polyhexamethylene azelaiamide (nylon 6,9), polyhexamethylene dodecanedioamide (nylon 6,12), polyheptolactam (nylon 7), polycapryllactam (nylon 8), polynonanolactam (nylon 9), polyundecanolactam (nylon 11), polydodecanolactam (nylon 12), and the like. Most preferred are polycaprolactam and polyhexamethylene adipamide.

The polyalkyloxazolines suitable as compatibilizing agents in the present invention are characterized by repeated units corresponding to the general formula:

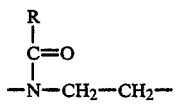

IV wherein R is a monovalent $C_1$-$C_4$ alkyl radical. Polyalkyloxazolines may be prepared by the ring-opening polymerization of 2-oxazolines in the presence of a cationic catalyst at a reaction temperature of about 0° C. to about 200° C. Their preparation is more fully described in U.S. Pat. No. 4,694,050, which is incorporated herein in its entirety by reference thereto.

Examples of polyalkyloxazolines useful as compatibilizers in the present invention are polymethyloxazoline, polyethyloxazoline, poly-n-propyloxazoline, and the like. A preferred polyalkyloxazoline is polyethyloxazoline, which is commercially available from The Dow Chemical Company under the trademark PEOX ®.

The polyalkyloxazolines of the present invention effectively act as mechanical or structural stabilizers which interlock the polycarbonate and polyamide networks in a manner not fully understood at this time, resulting in a dimensionally stable polyblend that will not delaminate upon extrusion and subsequent use. The polyalkyloxazolines are effective as compatibilizing agents when the polyalkyloxazoline molecules are from about 100 to about 100,000 units in length. Preferably, the lengths of the polyalkyloxazoline molecules are from about 1,000 to about 10,000 units.

The impact modifying rubber component of the present invention may be either a homopolymer rubber such as for example polybutadiene, polyisoprene or polybutene, or may be a random copolymer, or a block copolymer such as a styrene-butadiene or hydrogenated styrene-butadiene block copolymer, or a grafted copolymer. By impact modifying is meant capable of advantageously altering the impact resistance of a polymer blend. The preparation of homopolymers and random and block copolymers from monomers, useful as rubber impact modifiers in the present invention, is well known in the art.

The grafted copolymers useful as rubber impact modifiers in the present invention are generally characterized as having a core-shell structure, typically prepared by means of an emulsion polymerization process, or a core-matrix structure, typically prepared by a mass polymerization process. The grafted copolymers of the present invention generally comprise about 25% to 95% by weight of an elastomeric rubber core, and about 75% to about 5% by weight of either a rigid grafted-on thermoplastic polymer shell in the case of a core-shell copolymer, or a grafted-on thermoplastic polymer matrix in the case of a core-matrix copolymer. Examples of suitable grafted copolymers of the core-shell type are a methylmethacrylate/butadiene/styrene grafted copolymer (MBS rubber), and a butyl acrylate core-rigid thermoplastic shell copolymer. An example of a suitable grafted copolymer of the core-matrix type is an acrylonitrile/butadiene/styrene grafted copolymer (ABS copolymer).

The preferred grafted copolymers are generally obtained by polymerizing certain monomers in the presence of an acrylate or diene rubber core. By the term diene rubber is meant homopolymers of conjugated dienes having 4 to 8 carbon atoms such as butadiene, isoprene, piperylene, chloroprene, and copolymers of such dienes with other monomers, such as for example, acrylonitrile, methacrylonitrile, butyl acrylate, methyl methacrylate, styrene, α-methylstyrene, and the like. The rubber core may be at least partially crosslinked, or may contain thermoplastic polymer inclusions such as for example when mass polymerization is used to prepare the grafted copolymer. The aforementioned certain monomers are grafted onto the rubber core to form either the shell or matrix. At least one of these monomers is selected from the group including styrene and its derivatives, such as for example α-methylstyrene, acrylic acids, methacrylic acids, acrylonitrile, emthacrylonitrile, methyl acrylate, ethyl acrylate, n-butyl acrylate, isobutyl acrylate, methyl methacrylate, n-butyl methacrylate, isobutyl methacrylate, glycidyl methacrylate, maleic anhydride and the like. Preferred grafted copolymers are MBS rubbers, ABS copolymers, and hydrogenated styrene-butadiene copolymers.

Methods for preparing the grafted copolymers for use as rubber impact modifiers in the present invention are the known mass or emulsion polymerization processes as disclosed in U.S. Pat. Nos. 3,509,237, 3,660,535, 3,243,481, 4,221,833, 4,617,345 and 4,239,863, which are incorporated herein by reference thereto.

The compatibilized blends of the present invention may be prepared by mixing the polycarbonate, polyamide and polyalkyloxazoline, and optionally a rubber impact modifier in any order, by any conventional mixing apparatus. A suitable method comprises first mixing together polycarbonate and polyamide resins in a ratio from about 80:20 to about 20:80; preferably the ratio is from about 65:35 to about 35:65. Thereafter, a compatibilizing amount of the polyalkyloxazoline is added. By compatibilizing amount is meant that amount of polyalkyloxazoline which is effective to inhibit delamination of the polycarbonate and polyamide phases during extrusion and subsequent use. The compatibilizing amount of polyalkyloxazoline added to the polycarbonate and polyamide resins is desirably in the range of from about 0.1% to about 20%, based upon the total weight of polymers; preferably the range is from about 2% to about 5%, based upon the total weight of the polymers.

The compatibilized polymer blends of polycarbonate, polyamide and polyalkyloxazoline, may additionally contain, in either or both major phases, elastomeric impact modifiers such as, for example, acrylonitrile-butadiene-styrene copolymers (ABS copolymers), methylmethacrylate-butadiene-styrene copolymers (MBS rubbers), hydrogenated styrene-butadiene copolymers, functionalized EPDM copolymers, acrylic latexes, polybutadiene, polyisoprene, polybutene, and the like.

The compatibilized blends of the present invention may furthermore contain the conventional polymer additives such as, for example, fillers, reinforcing agents, stabilizers, dyes, flame retarding agents, mold-release agents, seed-forming agents, pigments, plasticizers, antistatic agents, ultraviolet light absorbers, lubricants, and the like.

The invention is more easily comprehended by reference to specific embodiments which are representative of the invention. It must be understood, however, that the specific embodiments are provided only for the purpose of illustration, and that the invention may be practiced otherwise than as specifically illustrated and described without departing from its scope.

EXAMPLES 1-4

Dry blends comprising polycarbonate and polyamide resins and polyethyloxazoline were prepared in the proportions by weight described in Table 1. After tumbling the dry ingredients for several minutes to insure good bulk mixing, the individual blends were dried in a circulating air oven with $-40°$ C. dew point air at $80°$ C. for 16 hours, and thereafter, quickly placed in air-tight containers until melt blended.

Subsequently, the blends were melt-mixed in a co-rotating twin screw extruder. The resultant blended polymer strands were quenched in a water bath and pelletized. These pellets were thoroughly dried, and injection molded into test specimens whose mechanical properties are described in Table 2.

TABLE I

| | BLEND COMPOSITIONS | | |
|---|---|---|---|
| | Polycarbonate[1] | Polyamide[2] | Polyethyloxazoline[3] |
| Example 1 | 57.5 | 40 | 2.5 |
| Example 2 | 60 | 40 | 1.25 |
| Example 3 | 60 | 40 | 2.5 |
| Example 4 | 60 | 40 | 5 |
| Comparison 1 | 60 | 40 | 0 |

[1]Blend of 90% CALIBRE 300-10 ® brand polycarbonate, manufactured by The Dow Chemical Company, and 10% KRATON G1651 ® brand hydrogenated styrene-butadiene block copolymer, manufactured by Shell Chemical.
[2]ZYTEL ST 801 ® brand rubber modified nylon 6,6, manufactured by DuPont.
[3]PEOX 200 ® brand polyethyloxazoline, manufactured by The Dow Chemical Company.

TABLE II

| | MECHANICAL PROPERTIES | | | | |
|---|---|---|---|---|---|
| | Tensile Yield (psi) | Tensile Rupture (psi) | Elongation (%) | Notched Izod (ft-lb/in) | Dart Impact (in-lbs) |
| Example 1 | 7,575 | 7,125 | 750 | 10.9 | 290 |
| Example 2 | 7,370 | 7,025 | 140 | 10.2 | 370 |
| Example 3 | 7,540 | 7,025 | 120 | 11.0 | 370 |
| Example 4 | 7,660 | 7,075 | 70 | 9.1 | 320 |
| Comparison 1 | 7,500 | 6,320 | 14 | 1.6 | 20 |

EXAMPLES 5-7

Dry blends were prepared as in examples 1-4, excepting that three different commercial grades of polyethyloxazoline were used. PEOX 50 ®, PEOX 200 ® and PEOX 500 ®, each manufactured by The Dow Chemical Company, have approximate weight average molecular weights of 50,000, 200,000 and 500,000 daltons, respectively. Test specimens were prepared as in Examples 1-4, and had the properties described in Table IV.

TABLE III

| | BLEND COMPOSITIONS | | |
|---|---|---|---|
| | Polycarbonate[1] | Polyamide[2] | Polyethyloxazoline |
| Example 5 | 58.5 | 39 | 2.5[3] |
| Example 6 | 58.5 | 39 | 2.5[4] |
| Example 7 | 58.5 | 39 | 2.5[5] |

[1]90% CALIBRE 300-10 ®; 10% KRATON G1651 ®
[2]ZYTEL ST 801 ®
[3]PEOX 50 ®
[4]PEOX 200 ®
[5]PEOX 500 ®

TABLE IV

| | MECHANICAL PROPERTIES | | | | |
|---|---|---|---|---|---|
| | Tensile Yield (psi) | Tensile Rupture (psi) | Elongation (%) | Notched Izod (ft-lb/in) | Dart Impact (in-lbs) |
| Example 5 | 7,080 | 7,775 | 167 | 7.8 | 66 |
| Example 6 | 7,575 | 7,125 | 750 | 10.9 | 290 |
| Example 7 | 7,125 | 7,530 | 135 | 10.5 | 250 |

The compatibilized blends of the present invention additionally have superior chemical resistance, as illustrated in Table V.

TABLE V

| SOLVENT RESISTANCE UNDER 2% STRAIN, GM-80 TEST[1] | | |
|---|---|---|
| Solvent | Blend of Example 1 | Polycarbonate[2] |
| Acetone | whitening; softening; no crazing | cracking; softening: plasticized; surface delamination |
| Butylacetate | softening; no crazing | softening; dulled |
| Ethylene Glycol | N/E[3] | N/E |
| Premium Unleaded Gasoline | surface softening; no crazing | softening; crazing |
| Heptane | N/E | crazing |
| Methanol | N/E | N/E |
| Toluene | whitening; softening; no crazing | severe swelling; cheesy; cracking |
| Water | N/E | N/E |

[1]Samples of ⅛" thickness placed in a 3 point jig, adjustable screw at center point and fixed points 1" apart. The screw was adjusted to impart a 2% flexural strain on the exterior skin of the sample and the specimen and fixture were totally immersed in the test solvent for 24 hours, removed, and evaluated.
[2]CALIBRE 300-10 ®.
[3]No effect.

What is claimed is:
1. A thermoplastic molding composition, comprising:
(A) an aromatic polycarbonate;
(B) a polyamide;
(C) a compatibilizing amount of a polyalkyloxazoline characterized by repeated units corresponding to the general formula:

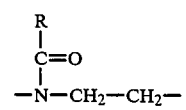

wherein R is a monovalent $C_1$–$C_4$ alkyl radical; and
(D) an impact modifying rubber.
2. A thermoplastic molding composition, comprising:
(A) an aromatic polycarbonate;
(B) a polyamide;
(C) a compatibilizing amount of a polyalkyloxazoline characterized by repeated units corresponding to the general formula:

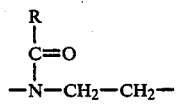

wherein R is a monovalent $C_1$–$C_4$ alkyl radical.

3. The thermoplastic molding composition of claim 1, or claim 2 wherein the aromatic polycarbonate is characterized by repeated units corresponding to the general formula:

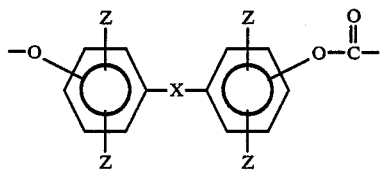

wherein X is a divalent $C_1$–$C_{15}$ hydrocarbon radical, a single bond, —O—, —S—, —$S_2$—, —SO—, —$SO_2$—, or —CO—, and each Z is independently hydrogen, a halo radical, or a $C_1$–$C_4$ alkyl radical.

4. The thermoplastic molding composition of claim 3, wherein the aromatic polycarbonate is Bisphenol A polycarbonate.

5. The thermoplastic molding composition of claim 1, or claim 2 wherein the polyamide is polycaprolactam or polyhexamethylene adipamide.

6. The thermoplastic molding composition of claim 1, or claim 2 wherein the polyalkyloxazoline molecules are from about 100 to about 100,000 units in length.

7. The thermoplastic molding composition of claim 5, wherein the polyalkyloxazoline molecules are from about 1,000 to about 10,000 units in length.

8. The thermoplastic molding composition of claim 1, or claim 2 wherein the polyalkyloxazoline is polyethyloxazoline.

9. The thermoplastic molding composition of claim 1, wherein the impact modifying rubber is a styrene-butadiene block copolymer, a hydrogenated styrene-butadiene block copolymer, polybutadiene, polyisoprene or polybutene.

10. The thermoplastic molding composition of claim 1, wherein the impact modifying rubber is a grafted copolymer, comprising:
   (A) about 25% to about 95% by weight of an elastomeric rubber core; and
   (B) about 5% to about 75% by weight of:
      (i) a rigid grafted-on thermoplastic shell; or
      (ii) a grafted-on thermoplastic polymer matrix.

11. The thermoplastic molding composition of claim 10, wherein the impact modifying rubber is a methylmethacrylate/butadiene/styrene grafted copolymer (MBS rubber), acrylonitrile/butadiene/styrene grafted copolymer (ABS copolymer), or hydrogenated styrene-butadiene copolymer.

12. The thermoplastic molding composition of claim 1, or claim 2 wherein the weight ratio of polycarbonate to polyamide is from about 80:20 to about 20:80.

13. The thermoplastic molding composition of claim 12, wherein the weight ratio of polycarbonate to polyamide is from about 65:35 to about 35:65.

14. The thermoplastic molding composition of claim 1, or claim 2 wherein the polyalkyloxazoline comprises from about 0.1% to about 20% of the total weight of polymers.

15. The thermoplastic molding composition of claim 14, wherein the polyalkyloxazoline comprises from about 2% to about 5% of the total weight of polymers.

16. The thermoplastic molding composition of claim 1, wherein the impact modifying rubber comprises less than about 20% by weight, based upon the total weight of polymers.

* * * * *